W. GRUN.
FLUID OPERATED REGULATOR.
APPLICATION FILED MAR. 4, 1912.

1,047,207.

Patented Dec. 17, 1912.

Fig. 1ª.

WITNESSES:
Charles Mathé
H. B. Tomkin

INVENTOR
WILLIBALD GRUN
BY John Lotka
ATTORNEY

UNITED STATES PATENT OFFICE.

WILLIBALD GRUN, OF FRANKFORT-ON-THE-MAIN, GERMANY.

FLUID-OPERATED REGULATOR.

1,047,207.  Specification of Letters Patent.  Patented Dec. 17, 1912.

Application filed March 4, 1912. Serial No. 681,558.

*To all whom it may concern:*

Be it known that I, WILLIBALD GRUN, a citizen of the German Empire, and a resident of Frankfort-on-the-Main, Germany, have invented certain new and useful Improvements in Fluid-Operated Regulators, of which the following is a specification.

My invention relates to regulators operated by the action of a moving fluid, whether liquid or gaseous. As is well-known, such devices comprise an actuating member exposed to the influence of the moving fluid, the automatic movement of such member being transmitted in any suitable way, to the auxiliary mechanism controlled by said member. This auxiliary mechanism (damper or any other device) is therefore regulated or adjusted in response to the varying action of the moving fluid.

My present invention relates to the actuating member and to the portion of the fluid-conveying conduit or passage coöperating with said member, it being entirely immaterial to this invention what kind of auxiliary mechanism is controlled by said member.

The object of my invention is to provide a very sensitive and efficient device of the above-indicated character, that is to say, one that will operate promptly and with considerable force, yet without consuming an excessive amount of energy. More particularly, I secure, by my invention, a gradual and very efficient conversion of the energy of the moving fluid, into pressure exerted on the actuating member. This improved result I secure chiefly by so regulating the throttling action exerted by the actuating member on the moving fluid, that the throttling velocity or rather the cross sectional area of the throttling portion, will be absolutely or approximately constant throughout the length of the actuating or throttling member, the term "length" being applied to that dimension which is in the direction of the fluid current. This feature of my invention and others will be more fully set forth in the detailed description following hereinafter, and the novelty will then be pointed out in the appended claims.

Figure 1:
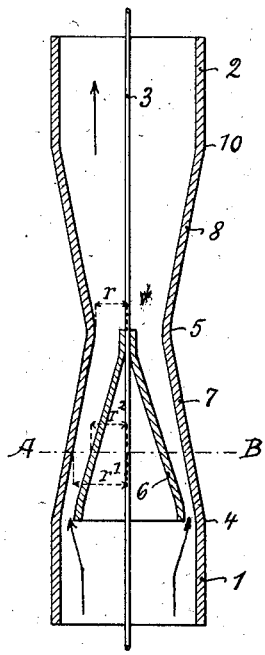
Figure 2:
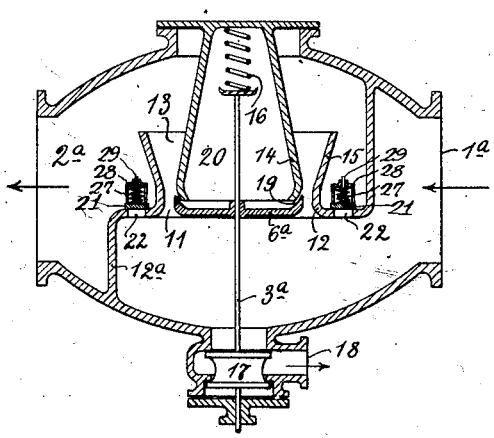
Figure 3:
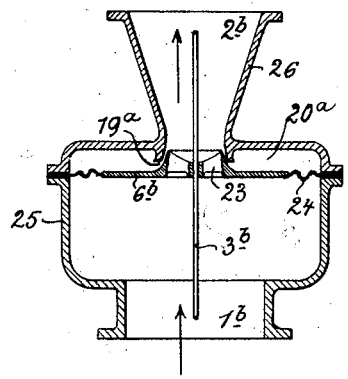
Figure 3:
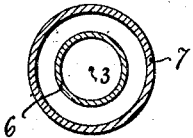

Three different embodiments of my invention are illustrated in Figures 1, 2 and 3 of the accompanying drawing, each of said figures being a central vertical section; Fig. 1ᵃ is a cross section on the line A—B of Fig. 1.

In Figs. 1 and 1ᵃ, I have shown at 1, 7, 8, 2 a portion of the stationary pipe or conduit through which the gaseous or liquid fluid travels lengthwise, say in an upward direction. In the particular construction shown, the body portions 1 and 2 are cylindrical and of the same diameter. The intermediate portions 7 and 8 are tapered or contracted gradually from said body portions 1, 2 to the junction 5 of the two tapered portions. Within the tapered portion 7 which is reached first by the traveling fluid, I locate the actuating member 6, here shown as a hollow tapering body open at the wide end which faces the supply body portion 1. The other end of said actuating member is preferably closed by the spindle or rod 3 to which said member is secured rigidly. The spindle or rod 3 extends lengthwise through the conduit and is movable therein lengthwise. It will be understood that the spindle or rod is connected in any well-known or approved manner, with the valve, damper or other auxiliary mechanism to be controlled by the actuating member 6. Various forms of such mechanism being well known in the art, I have not deemed it necessary to illustrate the controlled mechanism or the connection from the rod 3 to such mechanism. At the point 4 corresponding to the wide end of said member, the width of the annular space or passage left between the tapering conduit portion 7 and the actuating member 6, is less than the width of the same annular space or throttling passage at the point 5 corresponding to the narrow end of the actuating member, or in other words, less than the radius of the conduit at its narrowest point 5. The proportions employed to secure the best results should be such that the cross sectional area of the conduit at its narrowest point 5, will be equal to the cross sectional area of the annular passage at the entrance point 4 and at all other points, so that the annular passage will be of uniform cross sectional area from end to end. While this arrangement will secure the best results, approximations will often be sufficient in practice. In each case however, the width of the annular passage between the parts 6, 7 should increase from the entrance point 4 toward the outlet point 5. If the portion 7 is of circular cross section, as shown, the theoretically best shape of the member 6 can be calculated and plotted readily, by the formula $r_1^2 - r_2^2 = r^2$, in which $r$ designates the radius of the passage at the narrowest point or throat 5, $r_1$ the inner radius of the conduit 7 at any particular point thereof, and $r_2$ the outer radius of the actuating member 6 at the same point.

For any position of the actuating member 6 the cross sectional area of the passage between it and the conduit portion 7 is practically constant within its entire length. Therefore the velocity of the flow through said passage is constant and the pressure head in said passage is constant, and the difference between the pressure head in said passage and the total pressure in a forward direction due to both pressure head and velocity in the conduit portion 1, which difference constitutes the effective head tending to move the actuating member, is constant. This effective head will be operative on the entire inner or lower surface of the accelerating member so that the action, push or pull, exerted by said member on its rod or spindle 3 will be very quick and powerful. As the fluid passes from the throat 5 into the flaring conduit portion 8, the velocity diminishes gradually, with a corresponding increase of pressure, until at the entrance point 10 of the body portion 2 the pressure $p^2$ is almost equal to the original pressure $p'$. There is comparatively little loss of energy, owing to the fact that an ample passage, deviating but slightly from a straight line, is afforded to the fluid. It will be noted that the throttling or actuating member 6 begins at a point where the full cross section of the conduit is available, and extends within the tapering portion 7, that is to say, the flaring portion 8 in which the fluid gradually resumes its original pressure and velocity, is not obstructed by any portion of the actuating member 6. The fluid being unimpeded in the flaring conduit portion 8, the loss of energy is reduced to a minimum.

In Fig. 2, the fluid enters at $1^a$ and passes out at $2^a$. The actuating member $6^a$ in this case consists of a plate or disk having its outer edge curved or bent to form an annular passage 11 in conjunction with the stationary ring portion 12 which in the construction shown forms part of the partition $12^a$ separating the inlet compartment $1^a$ from the outlet compartment $2^a$. The proportions are preferably such that in every position of the actuating member $6^a$, the cross sectional area of the annular passage 11 remains the same to the very upper edge of the disk $6^a$, so that the efficiency of the device is the same for every position, since evidently the rate of flow through the passage 11 will be constant as long as the area of said passage is unchanged. After traveling through the throttling passage 11, the fluid is allowed to reduce its velocity and increase its pressure, by flowing through the gradually expanding passage 13 formed between the stationary reversely flaring surfaces 14 and 15. The actuating member $6^a$ is mounted on a transverse sliding rod $3^a$, under the influence of a spring 16, said rod being connected in any suitable manner with the actuated mechanism. For instance, as shown, a valve 17 mounted on the rod $3^a$ may control the diversion of a greater or smaller portion of fluid from the inlet compartment $1^a$ of the main conduit, to a branch outlet 18.

The operation of the device shown in Fig. 2 is substantially the same as in the case described with reference to Fig. 1. The fluid travels through the passage 11 with a velocity corresponding to the reduction which this passage effects from the full cross sectional area of the conduit, and the actuating member $6^a$ is moved against the tension of the spring 16, thus adjusting the valve 17 or other controlled member. As soon as the fluid passes beyond the bent edge of the actuating member $6^a$, it enters the widening channel 13 so that its velocity is reduced and its pressure increased, until at the outlet of compartment $2^a$ the pressure and velocity are nearly the same as at the inlet of the compartment $1^a$. The increased velocity obtaining in the reduced passage 11 is thus almost entirely converted into pressure. Furthermore, with my invention the actuating member (such as 6 or $6^a$) may be readily made of a large diameter, so that the power available for moving the actuated device (such as the valve 17) becomes correspondingly great. I am enabled by this invention to exert on the actuating member a force considerably greater than what corresponds to the difference $p'-p^2$ between the inlet pressure and the outlet pressure. If for instance this difference amounts to only $\frac{1}{2}$ atmosphere, I can, with the aid of my invention, subject the actuating member to a pressure difference amounting to as much as 1 atmosphere. This gives a power available for the adjustment or regulation of the valve 17 or other controlled member, much greater than with the constructions employed hitherto. The difference between the pressure $p'$ immediately in front of the actuating member and the pressure $p^2$ resulting from the conversion of the velocity of the fluid into pressure, is due solely to the losses caused by the friction of the air or other fluid during this conversion.

Since pressure does not begin to increase in the flaring channel (8 in Fig. 1 and 13 in Fig. 2) until the fluid has passed beyond the actuating member, I avoid any back pressure on said actuating member. The particular construction shown in Fig. 2 also has the further advantage that the fluid (say, air) flowing through the passage 11, 13 will, by an injector action, withdraw through the narrow opening 19, some of the air or other fluid contained within the chamber 20. The pressure on this side of the actuating member 6ª will thus be further reduced, thus increasing the power exerted on the rod 3ª. The difference between the pressures on the two sides of the actuating member may be regulated by an appropriate connection of the chamber 20 with the inlet compartment 1ª.

In order to reduce the resistance in the throttled portion of the conduit, and to minimize the losses due to friction, I may provide auxiliary valves controlling by-pass channels and arranged to open only when a predetermined difference of pressures is attained. Thus in Fig. 2 the valves 21 under the tension of springs 27 control by-pass openings 22 disposed around the throttled portion of the conduit. The valve may be in the form of an ordinary puppet valve having a spindle 29 sliding in a spider frame 28, the spring 27 being disposed between the top of said frame and said valve 21.

The operation of these auxiliary valves is as follows: Assuming that the initial pressure $p'$ is 1 atmosphere (above atmospheric pressure), the pressure at the narrow passage 11 (corresponding to the increased speed $c$) will under normal conditions be about .8 atmospheres (above atmospheric pressure) and the pressure $p^2$ in the chamber 20 will be but slightly less than $p'$, say .98 atmospheres (above atmospheric pressure); we would thus have $p'-p^2=.02$ atmospheres. Let us assume that the amount of air passing through the conduit per unit of time is doubled, the velocity will be doubled, and the difference of pressures quadrupled. In other words, the initial pressure $p'$ still being 1 atmosphere, the pressure at the narrow passage 11 would become .2 atmospheres, and the pressure $p^2$ in the chamber 20, equal to .92 atmospheres. The pressure difference $p'-p^2$ would thus become .08 atmospheres, that is, almost 1/10 of an atmosphere, if the valves 21 were omitted. In order to avoid such a large difference of pressures, the springs 27 acting on the valves 21 are of such power as to allow the valves to open at a much lower pressure, say when the pressure difference attains .03 atmospheres. Thus the desired power will always be exerted on the actuating member, yet in the case of an increase in the amount of fluid passing through the conduit, the difference between the pressures on opposite faces of the actuating member will not exceed the desired limit, since the by-pass or by-passes 22 will be opened at the proper time to prevent an increase of the pressure difference beyond the predetermined limit.

A third construction is shown in Fig. 3. Here the air or other fluid, on its way from the inlet 1ᵇ to the outlet 2ᵇ, travels through a gradually contracted central portion or nozzle 23 provided on the actuating member 6ᵇ formed as a disk or plate the outer edge of which is secured to a diaphragm 24. This diaphragm is held between the sections of the casing 25, the upper section having a flaring portion 26 corresponding in function to the conduit portion 8 of Fig. 1, or to the portions 14, 15 of Fig. 2. By arranging the throttling passage centrally, I minimize losses due to friction, and the construction shown in Fig. 3 is therefore particularly adapted for use in cases where the amount of fluid passing through the conduit is relatively small. The actuating member may be given a very large diameter, thus securing a powerful action on the rod 3ᵇ, without compelling the fluid to pass through a narrow opening or slit which would cause considerable loss by friction. In orther respects, the operation and advantages of the construction shown in Fig. 3, are substantially the same as set forth above with reference to Figs. 1 and 2, so that repetition will be unnecessary.

It will be obvious that various modifications may be made without departing from the nature of my invention as set forth in the appended claims. Thus a by-pass controlled by automatic valves may be employed not only in the manner illustrated by Fig. 2, but with other forms of my invention.

In Fig. 3 the contracted portion 23 of the actuating member is adapted to become seated tightly on a corresponding portion of the section 26. The chamber 20ª is subjected to injector action through the slit 19ª, in the same manner as explained with reference to Fig. 2.

I claim:

1. In a fluid-operated regulator, a conduit through which the operating fluid is adapted to pass, and a movable actuating member located within the conduit and throttling its passage-way, said passage-way of the conduit being provided with a gradually flaring portion on the delivery side of the actuating member, the latter terminating short of said flaring portion of the passage-way.

2. In a fluid-operated regulator, a conduit through which said fluid is adapted to pass, and an actuating member located within the conduit and throttling the same, the cross section of the throttled stream being practically constant along said member, and the passage-way of the conduit having a gradually flaring portion on the delivery side of the actuating member.

3. In a fluid-operated regulator, a conduit through which said fluid is adapted to pass, an actuating member located within the conduit and throttling the same, the cross section of the throttled stream being practically constant along said member, and a chamber located on the delivery side of the actuating member and forming therewith a narrow opening or slit communicating with the throttled portion of the conduit so as to withdraw fluid from said chamber through said slit by an injector action.

4. In a fluid-operated regulator, a conduit through which said fluid is adapted to pass, an actuating member located within the conduit and throttling the same, the cross section of the throttled stream being practically constant along said member, a by-pass enabling a portion of the fluid to travel through the conduit without coming in contact with the actuating member, and an automatic valve controlling said by-pass.

5. In a fluid-operated regulator, a conduit through which the fluid is adapted to pass, an actuating member located within the conduit and throttling the same, and a chamber located on the delivery side of the actuating member and forming therewith a narrow opening or slit communicating with the throttled portion of the conduit so as to withdraw fluid from said chamber through said slit by an injector action.

6. In a fluid-operated regulator, a conduit through which the fluid is adapted to pass, an actuating member located within the conduit and throttling the same, a by-pass enabling a portion of the fluid to travel through the conduit without coming in contact with the actuating member, and an automatic valve controlling said by-pass.

In testimony whereof I have signed this specification in the presence of two subscribing witnesses.

WILLIBALD GRUN.

Witnesses:
 JEAN GRUND,
 CARL GRUND.